United States Patent [19]

Ellis

[11] Patent Number: 5,237,468
[45] Date of Patent: Aug. 17, 1993

[54] CAMERA AND GRIPPER ASSEMBLY FOR AN AUTOMATED STORAGE LIBRARY

[75] Inventor: John F. Ellis, Tucson, Ariz.

[73] Assignee: International Business Machines Corporation, Armonk, N.Y.

[21] Appl. No.: 776,945

[22] Filed: Oct. 15, 1991

[51] Int. Cl.$^5$ .............................................. G11B 15/68
[52] U.S. Cl. ..................................... 360/92; 360/98.04
[58] Field of Search .................... 360/92, 98.04, 98.06; 369/36, 38, 40; 414/751

[56] References Cited

U.S. PATENT DOCUMENTS

| | | | |
|---|---|---|---|
| 4,484,855 | 11/1984 | Inaba et al. | 414/736 |
| 4,488,746 | 12/1984 | Inaba et al. | 294/86.4 |
| 4,505,636 | 3/1985 | Sugino et al. | 414/736 |
| 4,565,400 | 1/1986 | Nakashima et al. | 294/88 |
| 4,626,013 | 12/1986 | Barrows et al. | 294/88 |
| 4,652,204 | 3/1987 | Arnett | 414/751 |
| 4,762,455 | 8/1988 | Coughlan et al. | 414/4 |
| 4,835,450 | 5/1989 | Suguki et al. | 318/568.13 |
| 4,891,720 | 1/1990 | Grant et al. | 360/92 |
| 4,908,777 | 3/1990 | Wolfe et al. | 364/513 |
| 4,932,826 | 6/1990 | Moy et al. | 414/277 |
| 5,144,506 | 9/1992 | Sahota | 360/92 |

FOREIGN PATENT DOCUMENTS

257786 6/1988 Fed. Rep. of Germany .

Primary Examiner—Edward P. Westin
Assistant Examiner—T. Davenport
Attorney, Agent, or Firm—M. W. Schecter; F. E. Anderson

[57] ABSTRACT

Reliability of an automated storage library is improved by mounting at least one CCD cameras on a turret plate with two grippers, wherein the CCD camera provides video support for both grippers. The turret plate is rotatably mounted on the end of an anthropomorphic robot arm such that the camera and each gripper is rotated and angled into position as needed for viewing or gripping, respectively. The CCD camera is positioned to view a tape cartridge for capturing an image of the label attached thereto. While the captured image is being processed to verify the VOLSER, the first gripper is rotated into position and moved forward to grip the desired tape cartridge. The robot arm them moves the camera and gripper assembly to a tape drive and rotates the second gripper into position to remove another tape cartridge from the tape drive. The turret plate is again rotated to position the first gripper for inserting the verified tape cartridge into the tape drive. Thus pick-before-place operations may be performed with a single camera and two grippers. A second camera can be added to increase reliability for pick-before-place. Additionally, if either gripper fails, a single camera and a single gripper in any combination will allow the automated storage library to continue to provide storage and retrieval functions.

24 Claims, 8 Drawing Sheets

CAMERA AND GRIPPER ASSEMBLY FOR AN AUTOMATED STORAGE LIBRARY

FIELD OF THE INVENTION

This invention relates generally to the field of automated storage libraries and more particularly, to an automated storage library having a gripper/vision assembly wherein a camera provides vision functions for dual grippers.

BACKGROUND OF THE INVENTION

Numerous business applications require very large databases for storing information used in the business on a continuous basis. Database storage requirements may exceed 100s or 1,000s of gigabytes of data. Data storage costs generally limit such large databases to being stored on magnetic tape which presently offers the lowest data storage costs. Speed and reliability are important considerations, intensified by the relatively frequent access to the information stored within the database. However, tape storage generally requires the longest access time for retrieving the stored data. For example, once a tape is loaded onto a tape drive, accessing the data stored on the loaded tape is substantially slower than accessing data stored on a direct storage access device (DASD) or an optical disk. An even more substantial delay involves the time required to locate and mount the requested tape.

Automated storage libraries offer improved speed and reliability for storing and retrieving data stored on storage media, including magnetic tape. Early magnetic tape databases required an operator to retrieve a tape from a shelf and load the tape on a tape drive. This was very slow and prone to operator mistakes. Also, early magnetic tape reels were relatively large, i.e., 10.5 inch diameter, reel furthermore, only 9 tracks were available for writing data to the tape. Correspondingly large areas were necessary to store the many required 10.5 inch magnetic tapes. Newer magnetic tapes are protected by a cartridge housing, and are substantially smaller than the 10.5 inch reels. Additionally, data can now be written to 18 tracks or more. Hence, each magnetic tape cartridge can store many times more data than the older reels. The advances made in magnetic tape technology have made automated cartridge libraries more effective since smaller areas are required to store more data on lighter weight cartridges.

Access time and reliability is improved by automatically managing the storage and retrieval of tape cartridges. Automated cartridge libraries include a plurality of storage slots for storing library resident tape cartridges, a robotic picker mechanism, and one or more tape drives. The robotic picker operates on command to transfer a tape cartridge between a storage slot and a tape drive within seconds. Operational benefits of using an automated cartridge library include: greater reliability in tape cartridge mounts; better predictability in request-to-mount time; and improved off-shift availability. An input/output port is also provided on the automated cartridge library for inserting and exiting cartridges from the library.

The robotic picker typically includes either a picker or a robotic arm having a vision system and a gripper system mounted thereon. The vision system can view a label attached to a tape cartridge to verify a correct tape cartridge is being picked by the gripper system. The vision system may also provide feedback to the gripper system so that the gripper system moves to the correct position to properly pick the identified tape cartridge. Both reliability and speed can be further improved by providing dual gripper/vision assemblies mounted on the single robotic picker. Reliability is improved since a failed gripper or vision system is backed by the second gripper or vision system. Speed is improved because pick-before-place operations can be performed if dual gripper/vision assemblies are available. In a pick-before-place operation, the robotic picker moves to a desired storage slot and the first gripper/vision assembly picks a cartridge from that storage slot. Next the robotic picker moves to a tape drive and the second gripper/vision assembly removes another cartridge from the tape drive so that the picked cartridge can be inserted into the tape drive.

In an automated cartridge library having a single gripper/vision assembly, if either the camera or gripper fails, access to data is interrupted until the failing unit is repaired or replaced. If the gripper/vision assembly is an integrated unit, a failure of either requires replacing the entire assembly. In an automated cartridge library using dual integrated gripper/vision assemblies, if either a camera or a gripper fails, there is no interruption in accessing tape cartridges, but pick-before-place operations will no longer be possible, thereby increasing data access times. Furthermore, should a camera or gripper of a first gripper/vision assembly fail, and a second camera or gripper of the second gripper/vision assembly fail, further access to data will be completely halted until repairs or replacements can be made.

Several robots have been disclosed having dual grippers for improving speed and reliability. Barrows, in U.S. Pat. No. 4,626,013, describes a robot arm having dual grippers mounted on a rotatable wrist. The first gripper is perpendicular to the second gripper such that, by turning the wrist ninety degrees, the first and second grippers interchange positions. Sugino, et al., disclose a robotic arm having dual grippers attached to a rotatable plate in U.S. Pat. No. 4,505,636. The dual grippers are mounted perpendicular to the plate such that when the plate is rotated 180 degrees, the second gripper will be in the same position previously occupied by the first gripper. Both U.S. Pat. Nos. 4,626,013 and 4,505,636 teach mounting dual grippers in a single assembly having interchangeable positions for increasing efficiency and speed. Neither reference suggests using a vision system operating independently with each gripper.

A robot having dual gripper/vision assemblies is described in German Patent 257,786. Each gripper/vision assembly is mounted on a robotic arm such that each gripper is guided by a dedicated camera. Thus, if either camera fails, the associated gripper becomes nonfunctional also. A robot having dual grippers and a single vision system is described by Suzuki in U.S Pat. No. 4,835,450. Each gripper is mounted on a robotic arm to grip and assemble parts brought to the robot on a conveyer belt. The dual grippers are provided for assembly requirements and not for speed or reliability. A failing gripper causes the robot to stop until repairs can be made. Furthermore, the vision system is mounted away from the robotic arms to provide vision functions simultaneously for the grippers while parts are manipulated.

A dual gripper/vision assembly for use in an automated cartridge library is set forth in U.S. Pat. No. 4,932,826 by Moy, et al. Moy, et al., describe a robotic arm having a turntable attached for mounting first and second gripper/vision assemblies thereon. The first gripper/vision assembly is located adjacent to the second gripper/vision assembly but pointed in an opposite direction. Therefore, the first gripper/vision assembly may access tape cartridges in an inner wall while the second gripper/vision assembly may access tape cartridges stored in an outer wall. The turntable rotates such that a 180 degree rotation places the first gripper/vision assembly in the position previously occupied by the second gripper/vision assembly. Each gripper/vision assembly is mounted at an angle of approximately 10 degrees for picking and storing tape cartridges. Each gripper is able to roll independently of its associated camera for picking a tape cartridge from a storage slot in one position or placing that tape cartridge in a tape drive in a another position. The independent rolling ability is necessary since each vision system projects an image for storing, retrieving, and placing tape cartridges to provide feedback for fine positioning of the robotic arm. As a result, each gripper requires a dedicated vision system. If either vision system fails, pick-before-place operations are no longer possible. Also, if either a camera or gripper of the first gripper/vision assembly fails, and either a camera or gripper of the second gripper/vision assembly fails, the automated cartridge library storage and retrieval functions are interrupted until repairs can be made. Wolfe, in U.S. Pat. No. 4,908,777, describes the calibration techniques used with the apparatus taught by Moy et al. Calibration requires fine tuning at each storage slot requiring each camera to operate simultaneously with each gripper.

What is needed is a robotic picker having a gripper/vision assembly wherein a single camera can operate independently with either of two grippers. This allows pick-before-place operations to be performed with the single camera. Furthermore, if either gripper fails, data access may continue with the remaining single gripper and camera. Reliability is further improved by adding a second camera which also operates with either gripper such that if both a camera and a gripper fail, in any combination, data access may continue.

SUMMARY OF THE INVENTION

Accordingly, it is an object of the present invention to provide an improved gripper/vision assembly.

Another object of the present invention is to provide a gripper/vision assembly able to continue functioning, even if one of two grippers fail, thereby increasing the gripper/vision assembly reliability.

Yet another object of the present invention is to provide at least one camera and two grippers mounted on a rotatable turret plate wherein the camera operates independently with either gripper.

These and other objects of this invention are accomplished by an automated storage and retrieval system having a gripper/vision assembly mounted on a robotic arm, the gripper/vision assembly having at least one camera and first and second grippers. The gripper/vision assembly is able to perform pick-before-place operations with a single camera because the camera provides vision support for both grippers. The gripper/vision assembly includes a turret plate rotatably mounted to the robotic arm. A first gripper is mounted on the turret plate at a first location. A second gripper is mounted on the turret plate at a second location across from the first gripper. Each gripper is angled out from the turret plate such that either gripper may grasp an article while the other gripper is currently holding another article. The camera is adjustably mounted at a third location on the turret plate enabling it to view an article for both the first and second grippers.

The gripper/vision assembly provides improved reliability for the automated storage and retrieval system. If either gripper fails, the automated storage and retrieval system may continue to function since the single camera operates independently with either gripper. Furthermore, since the camera and grippers are independently mounted, each is quickly removable and easily replaced without affecting the others. Requiring only a single camera also permits a substantial cost advantage. A second camera may be added for improving reliability even further. With a second camera mounted, both a gripper and a camera, in any combination, may fail and the storage and retrieval system may continue to operate. Also, if either camera fails, pick-before-place operations may continue. This is possible since the second camera, like the first, operates independently with each gripper.

The foregoing and other objects, features and advantages of the invention will be apparent from the following more particular description of the preferred embodiment of the invention, as illustrated in the accompanying drawing.

DESCRIPTION OF THE PREFERRED EMBODIMENT

Figure 1:
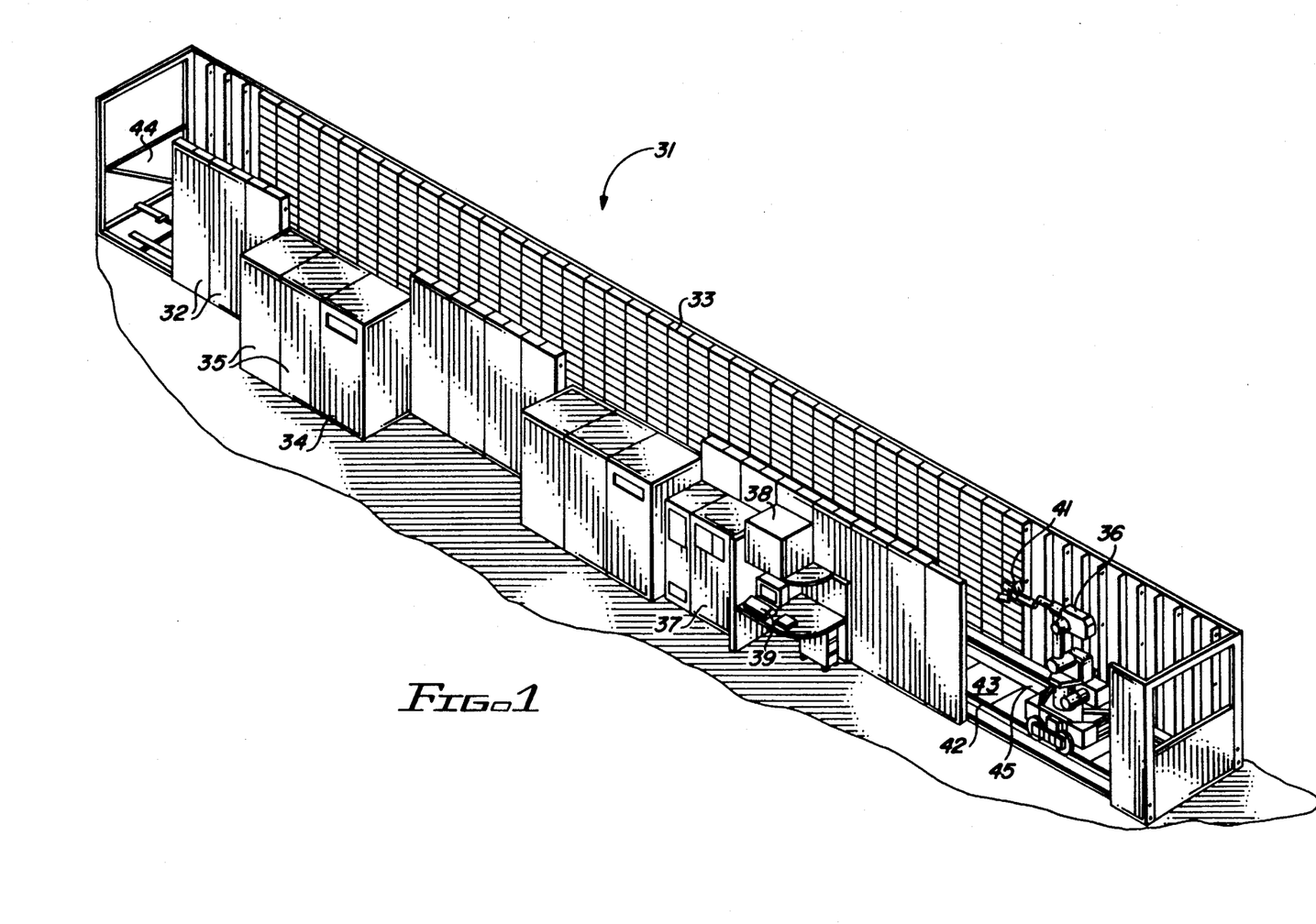
FIG. 1 is a pictorial diagram of an automated storage library having an anthropomorphic robotic picker.

Referring now to the drawing, like numerals correspond to like parts depicted in the several figures. FIG. 1 shows an automated cartridge library 31 for managing a large database, wherein data is stored on magnetic tapes. Each magnetic tape is housed in a plastic cartridge for protecting the magnetic tape and providing a convenient handling mechanism for a robotic picker. The automatic cartridge library 31 includes a plurality of modules 32, wherein each module is made from a plurality of magazine holders (not shown). Each magazine holder consists of a plurality of storage slots 33, for example, ten, and each storage slot capable of storing a magnetic tape cartridge therein. The automatic cartridge library 31 also includes at least one tape unit, for example, an IBM 3490 Magnetic Tape Subsystem having a controller 34 and tape drives 35. A robot 36, having a gripper/vision assembly 41 attached thereto, travels on an outrigger rail 42 and a guide rail 45 to transfer tape cartridges between the storage slots 33 and the tape drives 35. The robot 36 is anthropomorphic in that it is capable of human-like motions. A suitable anthropomorphic robot 36 is Model GMF S-10 robot, manufactured by Fanuc, Ltd.

A robot controller 37, attached to the automatic cartridge library 31, commands the robot 36. A service bay 43, for the robot 36, is located at one end of the automated cartridge library 31. The service bay 43 functions as a parking space for the robot 36 when it is not in use or when it is being serviced. An operator access bay 44 is provided at the other end of the automatic cartridge library 31 allowing service personal to enter. A remote terminal bay 38, accessible internally by the service personal, is attached to the automated cartridge library 31. Library management is available through a personal computer 39. The personal computer 39 allows an operator to determine system status, promote a tape cartridge mount status, and generally enter external instructions into the automated cartridge library 31.

The automated cartridge library 31 is expandable for storing additional tape cartridges or improving access time. Additional modules 32 can be added for increasing storage capacity. Additional outrigger rail 42 and guide rail 45 must then be added to allow the robot 36 to travel the additional distance. Also, the operator access bay 44 may be replaced by a second service bay 43 adding a second robot. An input/output port is also available (not shown) to allow an operator to add or remove tape cartridges to and from the automated cartridge library 31. Once a set of tape cartridges have been inserted into the input port, the robot 36 can be instructed to identify the tape cartridges and move them accordingly. Similarly, an operator is prompted to remove tape cartridges previously inserted into the output port by the robot 36.

Figure 2:
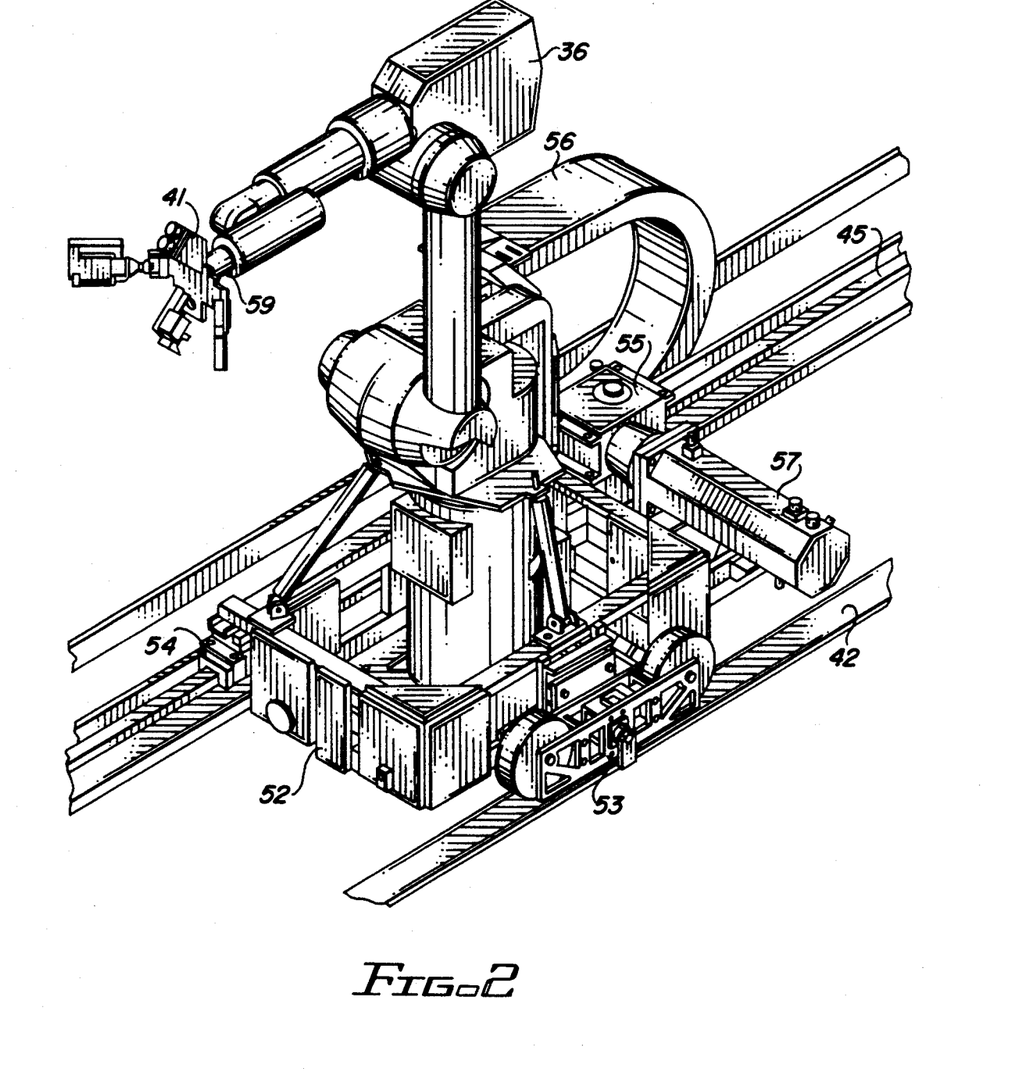
FIG. 2 is a pictorial diagram of an anthropomorphic robot with a gripper/vision assembly mounted on an arm of the robot.

FIG. 2 shows the robot 36 in greater detail. The robot 36 is supported by an outrigger assembly 53 which includes two wheels for riding on the outrigger rail 42. The outrigger rail 42 provides no guidance or control, but merely supports the robot 36. A linear bearing assembly 54, on the other hand, includes a drive pinion which engages teeth on a gear rack (not shown) below the guide rail 45 for guiding the robot 36. A servo motor 57 provides the drive necessary to move the robot 36 along the guide rail 45. A suitable servo motor 57 includes Model 30S-3000 servo motor manufactured by Fanuc, Ltd. The servo motor 57 does not drive the robot 36 directly, but instead the servo motor 57 is connected to a reducer 55. The reducer 55 is a right angle gear box for reducing the speed and changing the axis of the servo motor 57. The reducer 55 increases the servo motor 57 torque for moving the robot 36. Textron produces a Model SMV-25 reducer that provides the necessary functions. The robot 36 position may be accurately tracked by an optical encoder (not shown). The gripper/vision assembly 41 is shown attached to an end of an arm 59 of the robot 36. The arm 59 rotates to turn the gripper/vision assembly 41 to different positions. Power and signal lines are connected to the robot 36 via a cable chain 56. The cable chain 56 provides protection to the cables and is flexible for allowing the cables to follow the robot 36. Additional sections can be added to the cable chain 56 for supporting expansions to the automated cartridge library 31.

Figure 3:
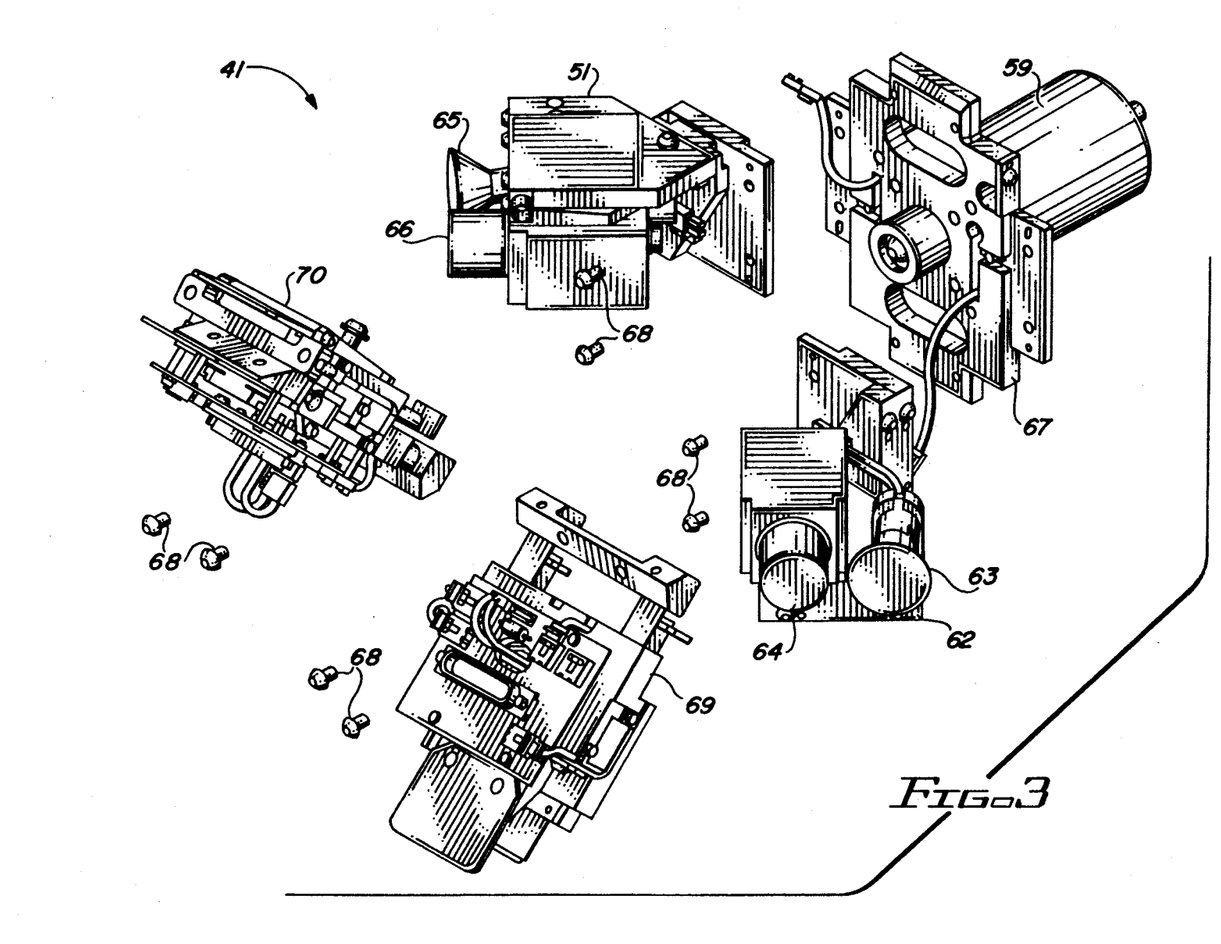
FIG. 3 is an exploded perspective view of the gripper/vision assembly.

FIG. 3 depicts the gripper/vision assembly 41 having camera assemblies 61 and 62 and grippers 69 and 70 removed from a turret plate 67. Each camera assembly 61 and 62 includes a camera 66 and 64, respectively, and a lamp 65 and 63, respectively. Suitable cameras 64 and 66 are charge coupled devices (CCD), Model TM-7EX camera manufactured by PULNiX. The lamps 63 and 65, for example, may be 12 volt, 20 watt halogen reflector lamps as manufactured by Phillips. The camera assemblies 61 and 62 and the grippers 69 and 70 are each held to the turret plate 67 by two screws 68. Additionally, two guide pins are provided on the turret plate 67 for each camera assembly 61 and 62, and for each gripper 69 and 70, to ensure correct alignment. Camera assemblies 61 and 62 and grippers 69 and 70, being independently mounted, may be removed and attached quickly and easily. Although two camera assemblies 61 and 62 are shown, the gripper/vision assembly 41 may perform pick-before-place operations with a single camera as described in the method of operation section.

Figure 4:
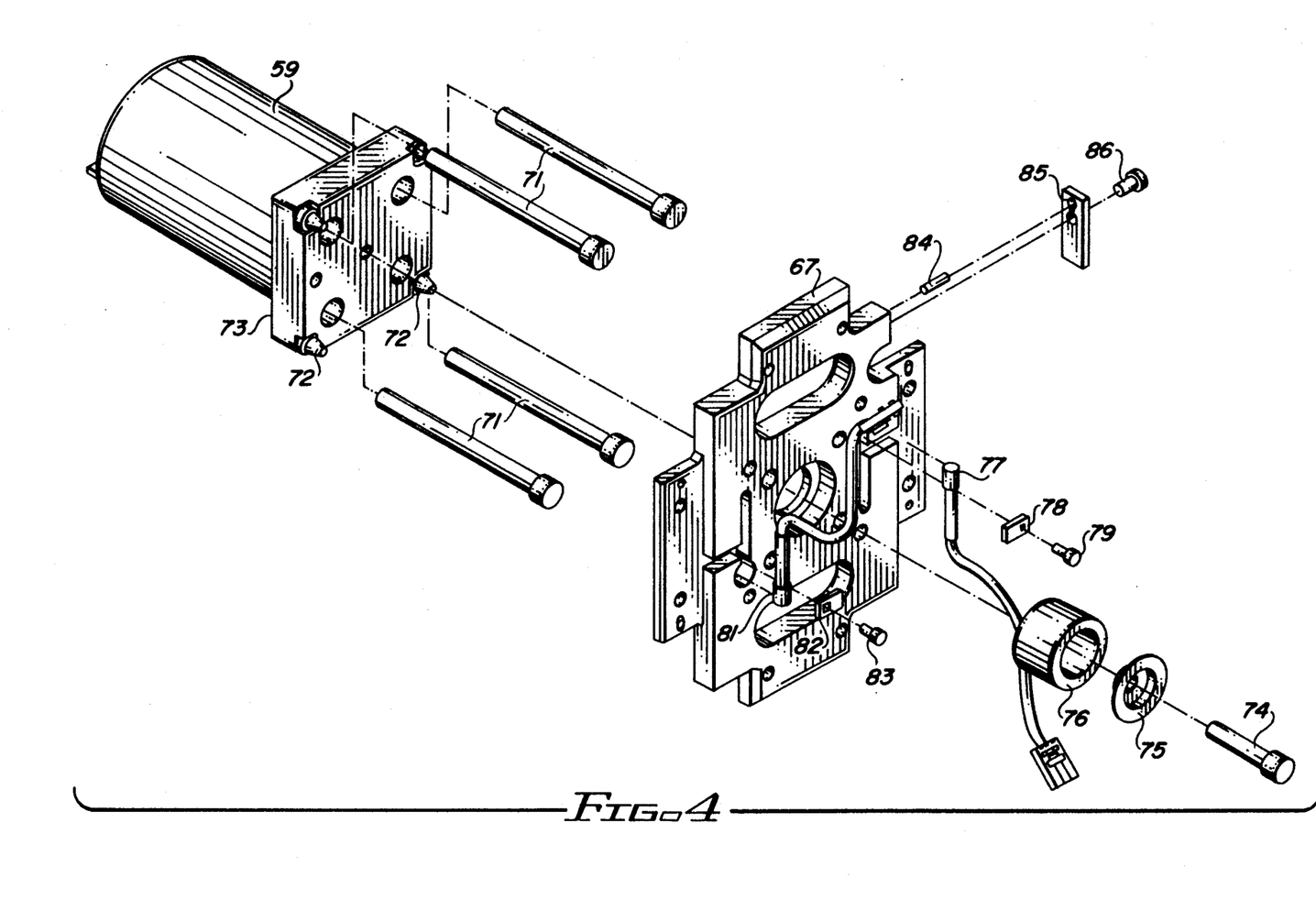
FIG. 4 is an exploded perspective view of the turret plate assembly.

Referring now to FIG. 4, the turret plate 67 is shown as it attaches to the robot arm 59. The turret plate 67, once fixed to the robot arm 59, is rotatable with the robot arm 59, and furthermore, overload protection is provided therebetween. A plate 73 is attached to the end of the robot arm 59 by four screws 71. Near each corner of a front face of the plate 73 is a tapered pin 72. Each tapered pin 72 is permanently fixed to the plate 72, for example, pressed thereinto. Each tapered pin 72 has an axis parallel to the axis of the end of the robot arm 59. A rear face of the turret plate 67 contacts the front face of the plate 73 such that each tapered pin 72 engages a corresponding hole in the turret plate 67. The tapered pins 72 are sized to be the same diameter, or to have a slightly smaller diameter, than the corresponding hole in the turret plate 67.

Figure 5:
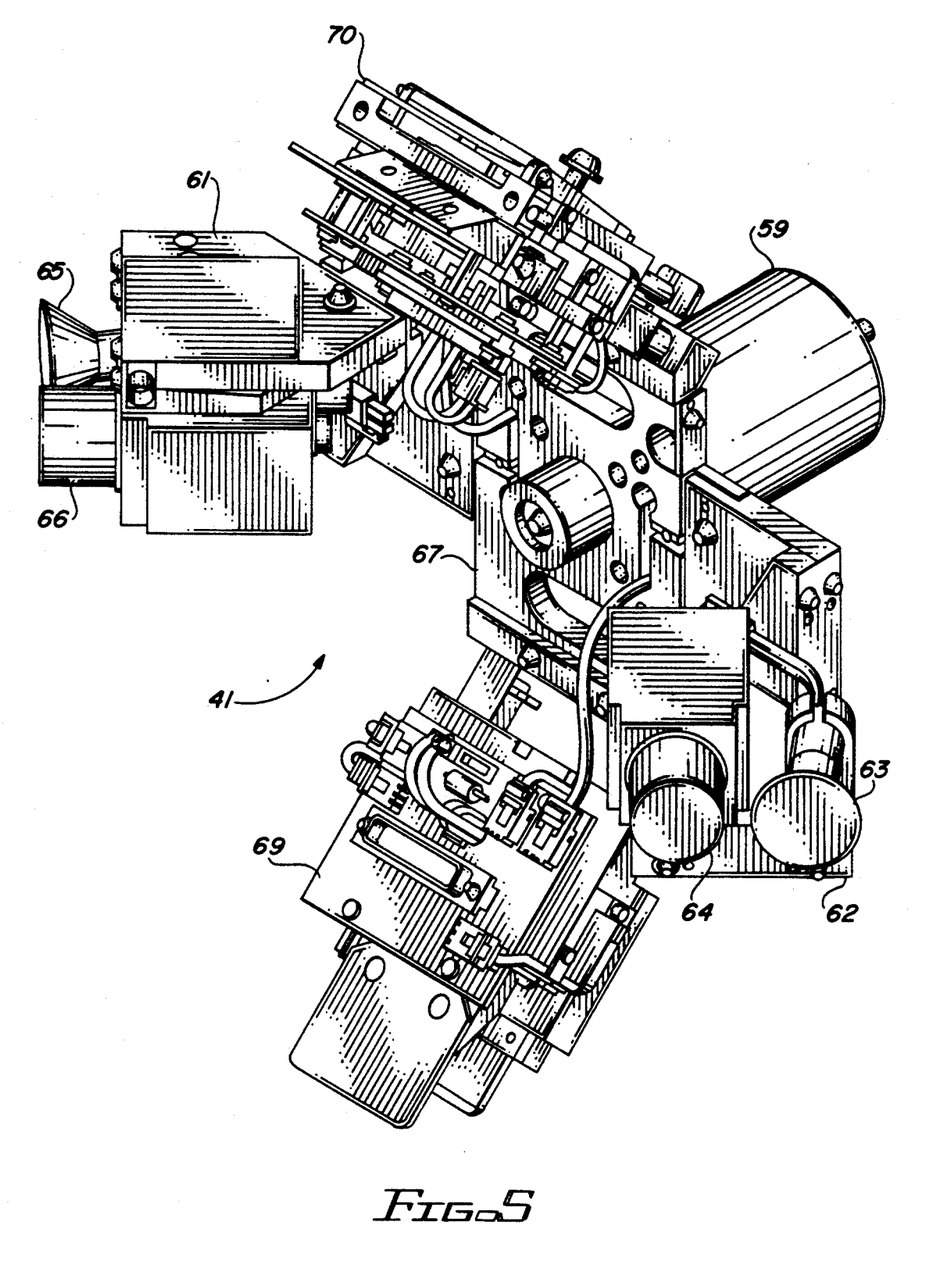
FIG. 5 is a perspective view of the gripper/vision assembly.

The rear face of the turret plate 67 is flexibly held against the plate 73 by a compression spring 76. A back end of the compression spring 76 contacts a front surface of a counterbore of a hole centered in the turret plate 67. The compression spring 76 is held against the counterbore surface by a screw 74 and a washer 75. The screw 74 is threaded into a hole centered in the front face of the plate 73. Inductive proximity sensors 77 and 81 (hereinafter referred to as overload sensors 77 and 81) are held into slots in the turret plate 67 by a clamp 78 and a screw 79, and a clamp 82 and a screw 83, respectively. The overload sensors 77 and 81, during normal operation, are held in close proximity to the front face of the plate 73. The plate 73, an aluminum plate, acts as an inductor core having a low permeability for increasing the inductance of each overload sensor 77 and 81. Should either overload sensor 77 or 81 be moved away from the plate 73, the inductance associated therewith will decrease indicating a change in proximity therebetween. Additionally, a clamp 85 is held to the turret plate 67 by a screw 86 and aligned by a pin 84 for holding a cable (not shown) in place, wherein the cable carries power and signals for the gripper/vision assembly 41. The gripper/vision assembly 41 is shown as assembled in FIG. 5.

If the gripper/vision assembly 41 is rotated by the robot arm 59 with a torque exceeding a restoring torque applied by the compression spring 76, the turret plate will pivot about an edge of the plate 73. As a result, a gap will be created between the plate 73 and the turret plate 67 on a side opposite a central axis. The overload sensor 77 and/or 81 will detect the gap and signal the controller 37 to stop and/or reverse the robot arm 59. Removing the overload torque allows the compression spring 76 to pivot the turret plate 67 back into its original position. The turret plate 67 alignment is reestablished by the tapered pins 72. The screw 74 may be adjusted to change the force required to overload the compression spring 76.

Figure 6:
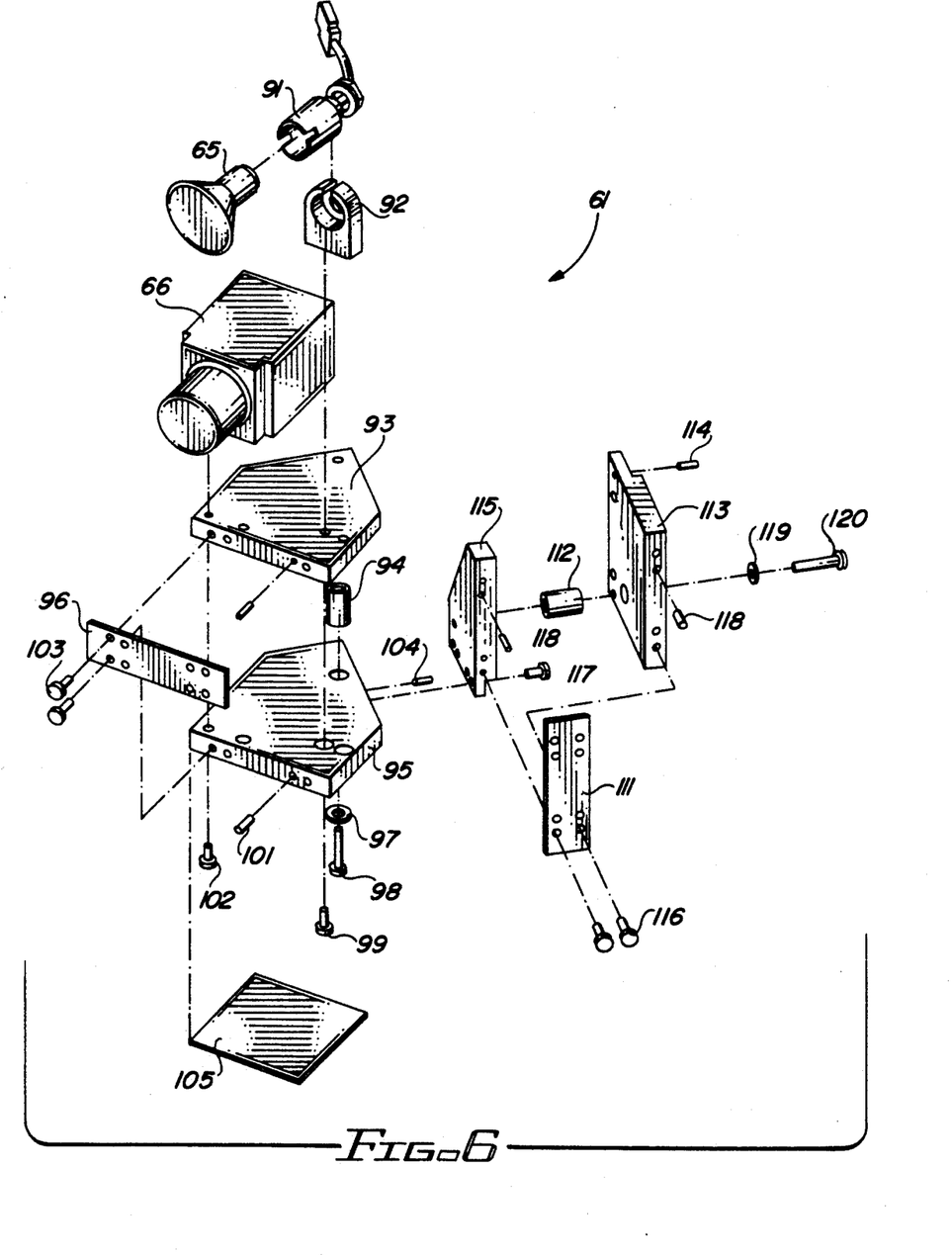
FIG. 6 is a an exploded perspective view of the camera and the camera mount.

FIG. 6 is an exploded view showing details of the camera assembly 61. The CCD camera 66 has an optical center relative to its body. However, this optical center may vary a by several degrees from camera to camera. Therefore, when the camera assembly 61 is mounted on the turret plate 67, the CCD camera 66 may not be pointing precisely to a desired external target. The error in the optical center could be compensated in the robot during calibration. Whenever a CCD camera 66 is replaced, timely robot recalibration would be required. Alternatively, the camera assembly 61 provides a simple means for independently adjusting the pitch and yaw of the CCD camera 66 by approximately ±4 degrees in each direction. Both the lamp 65 and the CCD camera 66 are attached to a top surface of an aluminum pitch plate 93, wherein pitch and yaw adjustments affect the lamp 65 and the CCD camera 66 simultaneously.

A lamp socket mount 92, for supporting a lamp socket 91, is held to the pitch plate 93 by screws 99. Similarly, the CCD camera 66 is held in place by screws 102. A bottom surface of the pitch plate 93 is beveled by an angular cut allowing for pivoting when attached to an aluminum pitch base plate 95. The pitch plate 93 is flexibly attached to the pitch base plate 95 by a steel flexure 96. The flexure 96 attaches by screws 103 and is aligned by pins 101. A pitch adjust screw 98 passes through a clearance hole in the pitch base plate 95 to a threaded hole in the pitch plate 93. A compression spring 94, coaxial to the pitch adjust screw 98, is sandwiched between the pitch plate 93 and the pitch base plate 95. A label 105 is attached to a bottom surface of the pitch base plate 95.

The flexure 96 positions the pitch plate 93 relative to the pitch base plate 95. Bending the flexure 96 about its major axis causes the pitch plate 93 to pivot relative to the pitch base plate 95. The amount of pivot is determined by the pitch adjust screw 98, wherein tightening causes increased compression on the compression spring 94 and draws the pitch plate 93 closer to the pitch base plate 95.

Yaw adjustment of the CCD camera 66 is accomplished similarly to the pitch adjustment. An aluminum yaw plate 115 has a front surface rigidly attached to a side of the pitch base plate 95 by screws 117 and aligned by pins 104. A rear surface of the yaw plate 115 is beveled by an angular cut allowing for pivoting when attached to an aluminum yaw base plate 113. The yaw plate 115 is flexibly attached to the yaw base plate 113 by a steel flexure 111. The flexure 111 attaches by screws 116 and is aligned by pins 118. A yaw adjust screw 120 passes through a clearance hole in the yaw base plate 113 to a threaded hole in the yaw plate 115. A compression spring 112, coaxial to the yaw adjust screw 120, is sandwiched between the yaw plate 115 and the yaw base plate 113.

The yaw base plate 113 is rigidly attached to the turret plate 67 as shown in FIG. 3. Thus when the yaw adjust screw 120 is turned in and out, the yaw base plate is stationary and the remaining portion of the camera assembly 61 moves relative to the turret plate 67. The camera assembly 61 may be mounted on an alignment fixture (not shown) having fiducials for aligning the camera 66's optical center before mounting the camera assembly 61 on the turret plate 67. After adjusting the pitch and yaw, the pitch and yaw adjust screws 98 and 120 can be locked into place. The camera assembly 61 may be made with looser tolerances due to the available pitch and yaw adjustments. The camera assembly 62 is identical to the camera assembly 61.

Figure 7A:
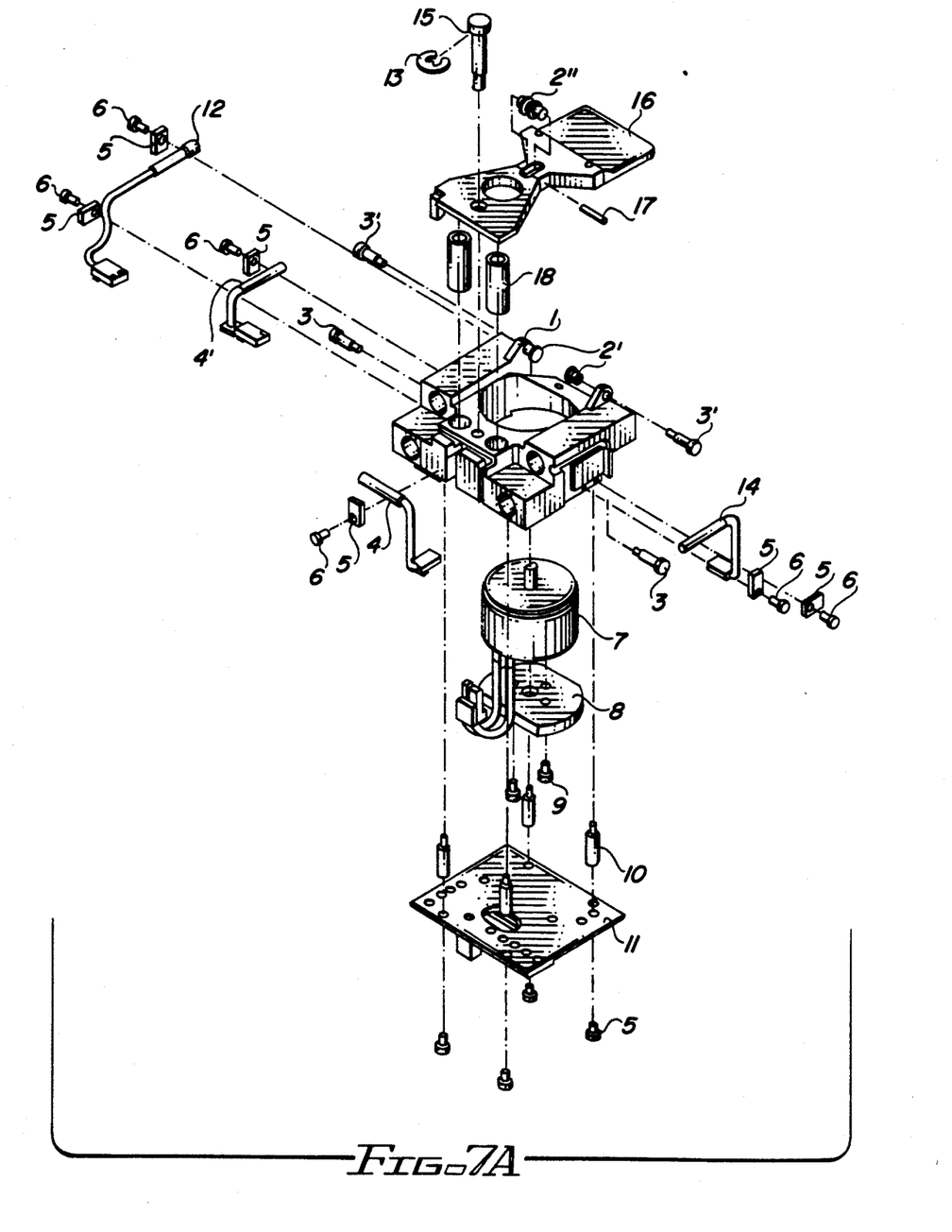
FIG. 7A is an exploded view of the gripper including the thumb and card assembly.
Figure 7B:
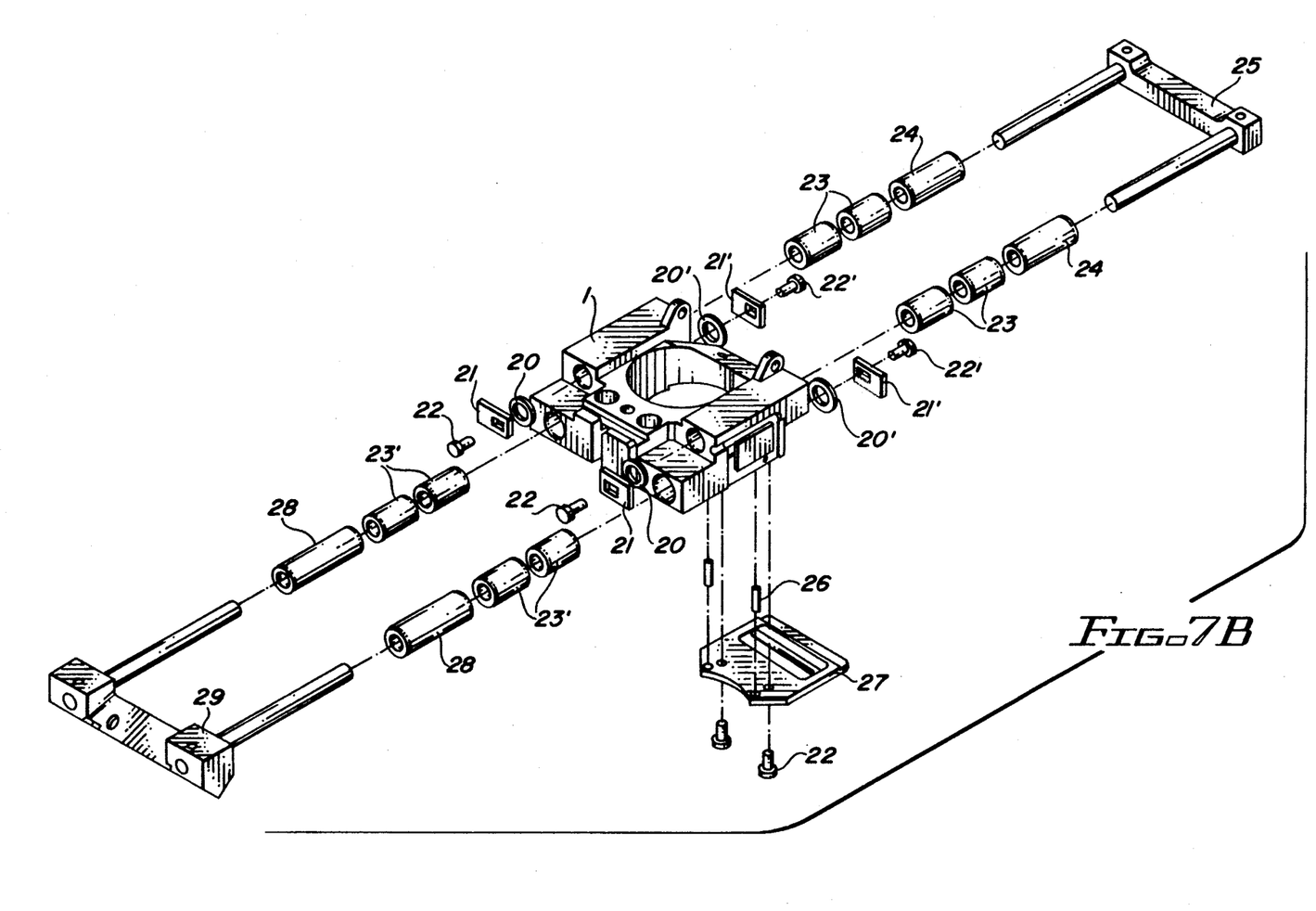
FIG. 7B is an exploded view of the gripper including a finger and eject bar.

Referring now to FIG.s 7A and 7B, the component parts of the gripper 69 are shown in exploded view form. In FIG. 7A, an aluminum grip body 1, to which the several gripper 69 components attach, is shown. A stationary aluminum finger 27 is attached to a bottom face of the grip body 1 by screws 22 and aligned by pins 26. A pivoting aluminum thumb 16 is pivotally attached opposite the finger 27 on a top face of the grip body 1 by screws 3' and bushings 2'. Compression springs 18 are sandwiched between a non-grasping end of the thumb 16 and the top face of the grip body 1. A gripping end (the end near the tape cartridge) of the thumb 16 is thus biased towards the finger 27 in a closed position by the force of compression springs 18. The motion of the the thumb 16 is limited by a stop screw 15 and E-ring 13. The stop screw 15 is screwed into a threaded hole on the grip body 1 top surface.

Both the finger 27 and the thumb 16 are made as thin as reliably allowable, and may have grasping features, for example, high friction surfaces on their inward surfaces for retaining the tape cartridges. As the gripper 69 approaches a tape cartridge, the thumb 16 pivots open (away from the finger 27) by energizing a solenoid 7. Once the tape cartridge is positioned between the thumb 16 and the finger 27, the solenoid 7 is deenergized and the thumb 16 pivots towards the finger 27 under the force of the compression springs 18. The compression springs 18 thus bias the thumb 16 in a normally closed position. Biasing the thumb 16 closed reduces the duty cycle of the solenoid 7 (improving reliability), and allows a tape cartridge to remain gripped if the gripper 69 losses power.

A main hole in the grip body 1 provides access to pivotally connect the solenoid 7 to the thumb 16. A pin 17 is press fitted into a plunger of the solenoid 7 and into bushings 2" that set in holes in the thumb 16. The solenoid 7 is supported by a mount 8. Screws 9 attach the solenoid 7 t the mount 8. The mount 8 is pivotally mounted to the bottom face of the grip body 1 by pins 3 in bearings (not shown) which are held in bearing journals in the grip body 1. The solenoid 7 is pivotally mounted to allow pivotal compliance with the motion of the thumb 16. Radial loading on the solenoid 7 plunger is thereby reduced extending the plunger and plunger bearing life. Power to the solenoid 7 and other sensor signals are carried to and from the gripper 69 by a card assembly 11 attached to the bottom face of the grip body 1 by standoff screws 10 and screws 6.

Inductive proximity sensors 4, 4', 12 and 14 are each held in slots in the grip body 1 by screws 6 and sensor clamps 5. The inductive proximity sensor 4 (hereinafter referred to as thumb open sensor 4) senses the thumb 16 open position. A steel ear is provided on the non-gripping end of the thumb 16 that aligns with an end of the thumb open sensor 4 when the thumb 16 in an open position. Having the thumb 16 in the open position causes the thumb open sensor 4 to signal the controller 37 that the gripper 69 is ready to grip a tape cartridge. The inductive proximity sensors 4, 12 and 14 sense positions of an eject bar 25 and the grip body 1 as will become apparent.

The eject bar 25 has two steel shafts supported by guide bearings 23 held in the grip body 1. The guide bearings 23 employ linear recirculating ball bearings.

Springs 24 are coaxial to the eject bar 25 steel shafts and bias the eject bar 25 forward or away from the grip body 1. The forward motion of the eject bar 25 is limited by the steel sensor flags 21 and the screws 22. The screws 22 screw into threaded holes in the ends of the eject bar 25 shafts holding the flags 21 in place. Moving the gripper 69 forward with the thumb 16 open for grasping a cartridge exposes the eject bar 25 to the tape cartridge end. As the gripper 69 continues forward, the eject bar 25 forward motion is stopped by the tape cartridge. The grip body 1 compresses the springs 24 as the grip body 1 approaches the tape cartridge which becomes positioned between the thumb 16 and the finger 27. Pushing the eject bar 25 towards the grip body 1 causes the sensor flags 21 to move away from the grip body 1 since they are attached to the eject bar 25 shaft ends. The inductive proximity sensor 14 (hereinafter referred to as cartridge presence sensor 14), is positioned to have a sensing end located near one of the sensor flags 21 when the eject bar 25 is biased fully forward. Moving the eject bar 25 back allows the cartridge/presence sensor 14 to signal the controller 37 that contact has been made with the tape cartridge. The gripper 69 continues forward until eventually the eject bar 25 travels far enough to cause the inductive proximity sensor 12 (hereinafter referred to as the reach complete sensor 12), to signal the controller 37 to stop the gripper 69 forward motion. The thumb 16 can then be closed to grip the tape cartridge. The forward motion of the gripper 69 is not stopped immediately due to system control considerations. The gripper 69 is therefore springably attached to the turret plate 67 by a grip mount assembly 29. The grip body 1 is supported on two steel shafts of the grip mount assembly 29 by guide bearings 23' located in the grip body 1. Springs 28 are coaxial to the grip mount assembly 29 steel shafts and bias the grip body 1 away from the turret plate 67. Sensor flags 21' and screws 22' act as a stop for the grip mount assembly 29. Inductive proximity sensor 4' (hereinafter referred to as the gripper position sensor 4'), senses the grip body 1 motion relative to the turret plate 67. Should the gripper 69 unexpectedly hit an object, the gripper position sensor 4' can signal the controller 37 to stop, back-up, and re-try. The gripper position sensor 4' is also used when teaching the robot 36 depth of reach. The gripper 70 is identical to the gripper 69.

A tape cartridge being gripped by the gripper 69 is eventually taken to the tape drive 35 or to a storage slot 33. When the gripper 69 is in position to insert the tape cartridge into a tape drive of the tape drives 35, the 16 thumb opens and the eject bar 25 is moved forward as biased by the springs 24. The tape cartridge is thus ejected from the gripper 69 and inserted into position in the tape drive. The thumb open sensor 4 confirms that the thumb 16 has opened, and the cartridge presence sensor 14 confirms that the tape cartridge has been ejected.

METHOD OF OPERATION

Before the robot 36 can manipulate tape cartridges, calibration must be performed to zero the robot 36 movements (referenced to itself), and to teach the robot 36 the tape cartridge locations. Teaching the robot 36 tape cartridge locations is accomplished by placing fiducials throughout the automated cartridge library 31. For example, a fiducial is placed on each magazine holder (each magazine holds ten tape cartridges). The CCD cameras 64 and 66, having a focal length of approximately 18 inches, may then locate a fiducial to establish X and Y coordinates. Depth, or reach, is then established by rotating a gripper 69 or 70 into position and moving the gripper/vision assembly 41 forward to the magazine. Rotating a gripper 69 or 70 into the reaching position simultaneously rotates the CCD camera 64 or 66 out of its viewing position. Therefore, the fiducial is not viewed during reach, hence the reach is a blind-reach (dead-reckoning). When the gripper 69, for example, touches the magazine, the grip body 1 will stop while the turret plate 67 continues forward (the gripper 69 is springably mounted to the turret plate 67). The gripper position sensor 4' signals the controller 37 that the magazine holder has been reached. The tape drives 35 have fiducials located thereon for similarly calibrating the robot 36.

Once the magazine holder location and orientation is established, the robot 36 will interpolate to locate each of the ten tape cartridges stored therein. This calibration process is repeated for each magazine holder in the automated cartridge library 31. Additionally, the controller 37 needs to know where each tape cartridge is stored. Initially, the automated tape cartridge library 31 may have all tape cartridges manually inserted into the storage cells 33. The robot 36 is then instructed to take an inventory. The robot 36 moves to each magazine holder where the CCD camera 64 or 66 captures an image of, for example, five tape cartridges. A video processor (not shown) can then process the captured image to read tape cartridge identifying characters on a label attached to each tape cartridge.

Referring back to FIG. 5, the gripper/vision assembly 41 is shown including camera assemblies 61 and 62, and grippers 69 and 70. The gripper/vision assembly 41, however, does not require both camera assemblies 61 and 62. Because each camera assembly 61 and 62 operates independently with either gripper 69 or 70, either camera assembly 61 or 62 will provide the necessary video functions. The CCD camera 66 is mounted on the turret plate 67 being aimed at an angle approximately forty five degrees relative to the turret plate 67. The CCD camera 64 is mounted similarly on the turret plate 67, but across from the CCD camera 66. The gripper 69 is mounted on the turret plate 67 to form a forty five degree angle with the turret plate 67 and located ninety degrees from both camera assemblies 61 and 62. Similarly, the gripper 70 is mounted on the turret plate 67 at a forty five degree angle and located across from the gripper 69.

Assume a request is sent to the automated cartridge library 31 to read data, for example, from a tape cartridge, volume serial number (VOLSER) "ABCDE", currently stored in one of the storage slots 33. The controller 37 instructs the robot 36 to travel, via the outrigger rail 42 and guide rail 45, to the storage slot known to be storing the requested tape cartridge "ABCDE". While traveling to that storage slot, the robot arm 59 can position the gripper/vision assembly 41 to be in the proper position to allow the CCD camera 66, for example, to view the label on the requested tape cartridge. Positioning the CCD camera 66 is usually necessary since only one CCD camera 64 or 66, or one gripper 69 or 70 can be in a position to view or grip a cartridge, respectively. This is apparent by inspecting the gripper/vision assembly 41. When the turret plate 67 is positioned parallel to the storage slots 33, each camera assembly 61 and 62, and each gripper 69 and 70 is at a forty five degree angle outward from the storage slots 33, and hence not in a position to view or grip, respectively. Therefore, to view a tape cartridge, the turret plate 67 must be rotated to properly orient the CCD camera 66, and the turret plate 67 must be angled at forty five degrees to position CCD camera 66 perpendicularly to the storage slots 33.

Once the CCD camera 66 is properly positioned, an image of the label on the requested tape cartridge is captured and digitized into the video processor. While the video processor is processing the digitized image to determine whether it is VOLSER "ABCDE", the robot arm 59 rotates the turret plate 67 ninety degrees clockwise to position the gripper 69. The solenoid 7 is energized opening the thumb 16 while the robot arm 59 moves the gripper/vision assembly 41 towards the tape cartridge. Thumb open sensor 4 signals the controller 37 that the gripper 69 is ready to grip the tape cartridge. As the gripper/vision assembly 41 continues to move forward, the eject bar 25 will hit the tape cartridge end causing the cartridge present sensor 14 to so indicate. When the tape cartridge is in position to be gripped the reach complete sensor 12 signals the controller 37 which in turn deenergizes the solenoid 7 closing the thumb 16. The robot arm 59 now reverses direction removing the tape cartridge from the storage slot.

If the gripper/vision assembly 41 was moved forward but was not properly calibrated to grasp the tape cartridge, the end of the gripper 69 will hit the magazine holder or the tape cartridge. This will cause the gripper position sensor 4' to indicate that the grip body 1 is no longer moving forward, a condition that should not exist until after the tape cartridge is in position to be gripped. The controller 37 can instruct the robot arm 59 to stop, move back, and move a predetermined distance, for example, 2 millimeters to the left, and try to grip the tape cartridge again. Should the second try also fail, the robot arm 59 may be instructed to stop, move back, and move a predetermined distance, for example, 4 millimeters to the right. The retry routine may be continued until successful or until a failure is acknowledged. If the robot 36 succeeds to grip a cartridge after retry, the new position information is stored to update the robot 36 calibration.

The video processor, having processed the captured image will verify that VOLSER "ABCDE" has or has not been grasped. If VOLSER "ABCDE" has been grasped, the robot 36 continues by moving to the tape drives 35 while rotating the turret plate 67 ninety degrees and positioning the gripper 69 to align with a tape drive. The turret plate 67 must be rotated ninety degrees because the tape cartridges are stored vertically and the tape drives 35 are installed horizontally. Assuming a tape drive is empty, the gripper/vision assembly 41 is moved forward, and when properly positioned, the thumb 16 opens and the eject bar 25 pushes the tape cartridge into the tape drive. The CCD camera 66 did not need to be positioned to recalibrate the robot 36 at the tape drives 35 since this position has been learned by the robot 36 during calibration. Should the robot 36 fail to properly position the tape cartridge for insertion into the tape drive, i.e., the gripper position sensor 4' signals the gripper 69 has unexpectedly hit a tape drive, a retry routine will be initiated.

In the event of a gripper 69 failure, for example, the solenoid 7 failing to engage, an operator can remove the tape cartridge from the gripper 69 by simply compressing the non-gripping end of the thumb 16 causing the release of the tape cartridge. Furthermore, the gripper 70 would be available to grip and place tape cartridges until a repair or replacement is made. The gripper 70 would simply be positioned and controlled similarly to the gripper 69. The gripper 70 can be used in the place of the gripper 69 since the CCD camera 66 does not view the tape cartridge or tape drive while the gripper 69 or 70 grips or places the tape cartridge. Similarly, should the camera assembly 61 fail, if the camera assembly 62 is included as part of the gripper/vision assembly 41, then the CCD camera 64 could operate in place of the CCD camera 66. Additionally, if either camera assembly 61 or 62, or either gripper 69 or 70, unexpectedly hits an object while the robot arm 59 is rotating the gripper/vision assembly 41, the turret plate 67 will be forced to partially separate from the plate 73 and overload sensors 77 and/or 81 will signal the controller 37 to stop and reverse.

Because the camera assemblies 61 and 62 operate independently with either gripper 69 or 70, pick-before-place operations may be performed with a single camera assembly. Initially, pick-before-place operates identically to the read data request for reading data from a specified tape cartridge as already described. However, when the robot 36 arrives at the tape drives 35, the gripper 70 is rotated into position to remove another tape cartridge already present in the tape drive. At that point, the gripper 69 holds a tape cartridge to be inserted into the tape drive, and the gripper 70 holds the other tape cartridge to be returned to a storage slot. The robot arm 59 then rotates the gripper/vision assembly 41 one hundred eighty degrees to position the gripper 69 so that the tape cartridge may be inserted into the tape drive.

Having both camera assemblies 61 and 62 mounted on the turret plate 67 provides redundancy such that pick-before-place operations may use both camera assemblies 61 and 62, but if one were to fail, pick-before-place operations could continue with a single camera assembly 61 or 62. Likewise, if both a gripper 69 or 70 fails, and a camera assembly 61 or 62 fails, in any combination, the automated tape cartridge library 41 may continue to transport tape cartridges between the tape drives 35 and the storage slots 33 (and to and from input and output ports). Therefore, by providing a gripper/vision assembly 41 having dual grippers, and at least one camera, wherein the grippers and cameras operate independently, library reliability is improved.

While the invention has been particularly described with reference to particular embodiments thereof, it will be understood by those skilled in the art that various other changes in detail may be made therein without departing from the spirit, scope, and teaching of the invention. The relationship of the cameras and grippers may be varied without substantially affecting the invention. For example, the cameras may be mounted ninety degrees apart instead of across from each other. Also, the mounting angle of the camera assemblies and grippers may be varied without changing the inventive concept disclosed herein. The invention is described using a automated cartridge library but applies equally to other types of storage and retrieval systems. Additionaly, the gripper/vision assembly has been described as attached to an anthropomorphic robot. The gripper/vision assembly, however, may be made to function as attached to other devices, i.e. a picker or other robotic arms. For example, the gripper/vision assembly may be attached to robot moving in a cylindrical envelope.

Accordingly, the invention herein disclosed is to be limited only as specified in the following claims.

What is claimed is:

1. An automated storage and retrieval system having a gripper/vision assembly mounted on a robotic arm for viewing one of a plurality of articles, and gripping the article, said gripper/vision assembly providing improved reliability by operating a vision portion of the gripper/vision assembly independently of a gripper portion, comprising:

a plate having a first surface rotatably attached to said robotic arm and a second surface, said plate rotatable through first, second, and third positions;

first gripper means mounted on said second surface of said robotic arm for gripping one of a plurality of articles, said first position for enabling the first gripper means to grip a first article;

second gripper means mounted on said second surface of said robotic arm for gripping one of a plurality of articles, said second position for enabling the second gripper means to grip the first article; and first vision means mounted on said second surface of said robotic arm, said first vision means for viewing one of a plurality of articles, said third position for enabling the first vision means to view the first article such that either of said first and second gripper means may grip the first article in response thereto.

2. The automated storage and retrieval system according to claim 1 wherein said plate is rotatable through a fourth position and further comprising a second vision means mounted on said second surface of said robotic arm, said second vision means for viewing one of a plurality of articles, said fourth position for enabling the second vision means to view the first article such that said first gripper means may grip the first article in response thereto and said second gripper means may grip the first article in response thereto.

3. The automated storage and retrieval system according to claim 2 wherein an article is outside the field of vision of both said first and second vision means during gripping by either one of said first and second gripping means.

4. The automated storage and retrieval system according to claim 3 wherein said plate mounted on said robotic arm is mounted to provide overload protection.

5. The automated storage and retrieval system according to claim 4 wherein said first and second vision means are adjustably mounted on the second surface of said plate.

6. The automated storage system according to claim 5 wherein said robotic arm is anthropomorphic.

7. The automated storage system according to claim 6 wherein said first and second gripper means are mounted across from one another, each first and second gripper means being biased in a normally closed position.

8. An automated storage and retrieval system for transporting articles between a plurality of locations within the storage and retrieval system, comprising:

controlling means for issuing commands for transporting a first one of a plurality of articles;

positioning means coupled to said controlling means for moving the first article from a first to a plurality of locations to a second of the plurality of locations;

first vision means mounted on said positioning means for viewing the first article at the first location, said positioning means positioning said viewing means for capturing an image of the first article, wherein the first article is within a field of vision of said first vision means;

first gripping means mounted on said positioning means for gripping the first article at the first location, said positioning means positioning said first gripping means such that while is gripped, the first article being outside the field of vision of said first vision means; and second gripping means mounted on said positioning means for gripping a second one of the plurality of articles at the second location, said positioning means positioning said second gripping means such that the second article is gripped, while being outside the field of vision of said first vision means, said positioning means repositioning said first gripping means for placing the first article at the second location.

9. The storage and retrieval system according to claim 9 further comprising a second vision means mounted on said positioning means, said second vision means for viewing one of the plurality of articles.

10. The storage and retrieval system according to claim 9 wherein said positioning means is a robot.

11. The storage and retrieval system according to claim 9 wherein said first and second vision means are first and second CCD cameras, respectively.

12. A method of transporting at least one of a plurality of articles between first and second locations, comprising the machine executed steps of:

moving a gripper/vision assembly to the first location;

positioning the gripper/vision assembly such that a first article is within a field of vision of a first camera;

capturing an image of the first article, with the first camera;

in response to said capturing, positioning the gripper/vision assembly such that a first gripper grips the first article while the first article is outside the field of vision of the first camera;

moving the gripper/vision assembly to a second location;

positioning the gripper/vision assembly such that a second gripper grips a second article;

removing the second article from the second location; and positioning the gripper/vision assembly such that the first gripper places the first article in the second location.

13. An automated storage and retrieval system for performing pick-before-place operations, having a gripper/vision assembly mounted on an anthropomorphic robotic arm, wherein vision and gripper portions of said gripper/vision assembly function independently, comprising:

a turret plate rotatably mounted on the anthropomorphic robotic arm;

a first gripper mounted on said turret plate at a first location;

a second gripper mounted on said turret plate at a second location, said first and second grippers being located such that said first gripper is for handling a first article while said second gripper grips a second article; and a first camera adjustably mounted on said turret plate at a third location rotationally between the first location and the second location such that said first camera may operate to view the first and second articles for said first and second grippers, said first camera and said first and second grippers providing the visual and gripping functions necessary to perform pick-before-place operations.

14. The automated storage and retrieval system according to claim 13 further comprising a second camera mounted on said turret plate at a fourth location rotationally between the first location and the second location, said second camera for viewing the first and second for said first and second grippers.

15. The automated storage and retrieval system according to claim 14 wherein said turret plate is springably mounted to said robotic arm with sensors provided for signaling an overload condition.

16. The automated storage and retrieval system according to claim 15 wherein said first location is rotationally positioned about said turret plate 180 degrees from the second location, 90 degrees from the third location, and 270 degrees from the fourth location.

17. The automated storage and retrieval system according to claim 16 wherein each said first and second cameras and each said first and second grippers are mounted on said turret plate at an angle less than 90 degrees.

18. The automated storage and retrieval system according to claim 17 wherein said first gripper is biased normally closed.

19. The automated storage and retrieval system according to claim 18 wherein said first camera further comprises a mounting assembly having pitch and yaw adjustments.

20. An automated cartridge library having a plurality of storage slots for storing cartridges therein, and having a plurality of drives for receiving the cartridges and reading data therefrom, the automated cartridge library having a processor for controlling storage and retrieval operations, the automated cartridge library for performing pick-before-place operations, comprising:
   a robot coupled to said processor for receiving commands for moving between the storage slots and the drives, the robot having an arm;
   a turret plate having a first face attached to the arm, the first face being attached such that overload protection is provided to said turret plate and arm, and said turret plate having a second face;
   a first gripper attached to the second face of said turret plate wherein said first gripper picks a cartridge from a storage cell when said turret plate is moved toward said storage slots and rotated to a first position, said first gripper inserting the picked cartridge into a drive when said turret plate is moved toward said drive and rotated to a second position;
   a second gripper mounted on the second face of said turret plate such that said second gripper can remove another cartridge from a drive when said turret plate is moved toward said drive and rotated to a third position, and said second gripper can place another cartridge in a storage slot when said turret plate is moved toward said storage slots and rotated to a fourth position; and
   a first camera adjustably mounted on the second face of said turret plate rotationally between said first and second grippers, said first camera for viewing one of the cartridges prior to its being picked or removed by said first or second grippers.

21. The automated storage and retrieval system according to claim 20 further comprising a second camera adjustably mounted on the second face of said turret plate rotationally between said first and second grippers, said second camera for viewing one of the cartridges prior to its being picked by said first or second grippers.

22. The automated storage and retrieval system according to claim 21 further comprising first and second lamps mounted on said turret plate for providing illumination for said first and second cameras, respectively.

23. The automated storage and retrieval system according to claim 22 wherein said first gripper further comprises:
   a main body;
   a finger rigidly mounted on said main body;
   a thumb pivotally mounted on said main body and opposed to said finger;
   a spring mounted on said main body and contacting said thumb for biasing the thumb towards said finger in closed position; and
   a solenoid mounted on said main body and attached to said thumb to push the thumb away from said finger to an open position when the solenoid is energized.

24. The automated storage and retrieval system according to claim 23 wherein said first camera further comprises:
   a pitch base plate;
   a pitch plate flexibly mounted to said pitch base plate and adapted for holding said first camera and said first lamp;
   a first screw coupled between said pitch base plate and said pitch plate for adjusting the pitch of said first camera;
   a yaw plate rigidly mounted to said pitch base plate;
   a yaw base plate flexibly mounted to said yaw base plate and rigidly mounted to said turret plate; and
   a second screw coupled between said yaw plate and said yaw base plate for adjusting the yaw of said first camera.

* * * * *

UNITED STATES PATENT AND TRADEMARK OFFICE
CERTIFICATE OF CORRECTION

PATENT NO. :     5,237,468
DATED      :     August 17, 1993
INVENTOR(S) :    John F. Ellis It is certified that error appears in the above-identified patent and that said Letters Patent is hereby corrected as shown below:

At column 13, line 47, the words "claim 3" should be --claim 2--.

At column 13, line 66, the words "to a" should be --of the--.

At column 14, line 23, the words "claim 9" should be --claim 8--.

At column 14, lines 10 and 11, the words "that while is gripped, the first article" should be --that the first article is gripped, while--.

Signed and Sealed this

Thirty-first Day of May, 1994

Attest:

BRUCE LEHMAN

*Attesting Officer*    *Commissioner of Patents and Trademarks*